(12) United States Patent
Cummings et al.

(10) Patent No.: US 6,215,085 B1
(45) Date of Patent: Apr. 10, 2001

(54) STUD WELDING DEVICE

(75) Inventors: Gerald Cummings, Vancouver (CA); Dieter Mauer, Lollar (DE)

(73) Assignee: Emhart Inc., Newark, DE (US)

( * ) Notice: Subject to any disclaimer, the term of this patent is extended or adjusted under 35 U.S.C. 154(b) by 0 days.

(21) Appl. No.: 08/817,475

(22) Filed: Apr. 18, 1997

Related U.S. Application Data

(63) Continuation of application No. PCT/US95/14197, filed on Oct. 18, 1995.

(51) Int. Cl.$^7$ ................................................ B23K 9/00
(52) U.S. Cl. ............................................. 219/98; 219/99
(58) Field of Search ........................................ 219/98, 99

(56) References Cited

U.S. PATENT DOCUMENTS

| | | | |
|---|---|---|---|
| 5,252,802 | 10/1993 | Raycher | 219/98 |
| 5,502,291 | 3/1996 | Cummins | 219/98 |
| 5,798,494 | 8/1998 | Aoyama et al. | 219/98 |
| 5,824,987 | 10/1998 | Volk | 219/98 |

FOREIGN PATENT DOCUMENTS

| | | |
|---|---|---|
| 343640 | 3/1991 | (JP) . |
| 5184346 | 6/1993 | (JP) . |

*Primary Examiner*—Patrick Ryan
*Assistant Examiner*—Anjan Dey
(74) *Attorney, Agent, or Firm*—Edward D. Murphy

(57) ABSTRACT

Stud welding device with an axially displaceable adjusting element (3, 17) for displacement from a front position into a rear position and back, in which a magnetic field and a coil (15) interact in such a way that, when the coil (15) is connected to a controllable current source (41) an axial force is produced in order to displace the adjusting element (3, 17), the movement of which is transmitted to a stud holder (2), characterized in that the coil (15) is rigidly arranged on a hollow body (14) which is connected to the adjusting element (3, 17) and is arranged axially movably in an air gap (13) between a magnetizable core (8) and a magnetizable sheath (10), the magnetic field being conveyed via at least one yoke (9) connecting the core (8) and the sheath (10) while passing radially through the coil (15), the coil exerting on the adjusting element (3, 17) an axial force acting only in one direction as a function of the direction of current during current control.

19 Claims, 4 Drawing Sheets

STUD WELDING DEVICE

This application is a continuation of PCT/US95/14197 filed Oct. 18, 1995.

BACKGROUND OF THE INVENTION

The invention relates to a stud welding device with an axially displaceable adjusting element for displacement from a front position into a rear position and back, in which a magnetic field and a coil interact in such a way that, when the coil is connected to a controllable current source an axial force is produced in order to displace the adjusting element, the movement of which is transmitted to a stud holder.

DESCRIPTION OF THE PRIOR ART

A stud welding device of this type is known from U.S. Pat. No. 5,321,226. The operating principle on which this device is based is shown in FIG. 5 thereof. With that device, a permanent magnet designed as a bar magnet is moved axially to and fro so as to form an adjusting element on which a stud holder is arranged so that a stud fixed in the stud holder is axially displaced during displacement of the adjusting element. This displacement is then used in the conventional manner for igniting an arc and welding the stud to the workpiece. The forces to be applied for displacing the bar magnet originate from two coils arranged axially one behind the other with opposing winding directions which form electromagnets of opposing polarity during the flow of current. The bar magnet can move axially along the coil axes, more specifically to a stop at the two respective outer ends of the coils.

When the two coils are excited by the flow of electric current, the bar magnet which is prevented from moving outwardly by the stops is to move in the direction of the other coil by which it is initially repelled owing to the direction of the magnetic field produced by it. This repelling force has to be overcome by the coil which initially comprises the bar magnets so the bar magnet moves out of this coil and enters the other empty coil until it reaches the respective stop at its other end. For the return movement of the bar magnet, the polarity of the flow of current then has to be reversed via the two coils connected in series. This magnetic system is obviously dependent on special balancing of the interacting magnetic fields, with the result that, during continued movement of the permanent magnet, the forces acting on it vary to a considerable extent. Once the repelling forces initially emanating from the empty coil have been overcome, the bar magnet, once it has entered the empty coil, is drawn into the empty coil with continuously increasing forces. This is a problem for controlled movement of the adjusting element at a specific speed at the respective individual positions of the stud, particularly if the stud is to be prevented from sinking into the melt produced by the arc at an excessively high speed.

The object of the invention is, while utilizing the magnetic principle mentioned at the outset, to design the stud welding device in such a way that at a given current strength which excites the coil, the axial force acting by the magnetic field on the adjusting element remains substantially equal independently of position.

SUMMARY OF THE INVENTION

According to the invention this is achieved in that the coil is rigidly arranged on a hollow body which is connected to the adjusting element and is arranged axially movably in an air gap between a magnetizable core and a magnetizable sheath, the magnetic field being conveyed via at least one yoke connecting the core and the sheath while passing radially through the coil, the coil exerting on the adjusting element an axially force acting only in one direction as a function of the direction of current during current control.

With this design, the hollow body with the coil carried by it forms a relatively lightweight component. During its axial displacement at least in the range of movements during the welding process, it remains substantially in the radially extending magnetic field so the coil is exposed to a substantially steady axial force during the axial displacement of the coil while the current flowing via the coil is constant. The axial forces acting on the coil and therefore the hollow body with the adjusting element can therefore be calculated accurately for each position within the path of adjustment of the coil. This results in the significant advantage over the bar magnets which are axially displaced in the prior art that the components which are decisive for producing the axial forces, namely the coil and the hollow body carrying it, can be relatively light weight in construction. For example, the hollow body can consist of a light plastics material. On the other hand, the bar magnet according to the prior art has a considerable mass if it is to produce a magnetic field of significant intensity at all. This mass counteracts the accelerations which are required for the adjusting movement of the adjusting element and then have to be produced by correspondingly high currents through the two coils connected in series. On the other hand, higher accelerations and decelerations can easily be achieved with the design according to the invention owing to its relatively low mass.

The accuracy of adjustment of the adjusting element can be increased by designing the device in such a way that a spring which presses the adjusting element into an end position defined by a stop acts upon the adjusting element. If the spring acts against the axial force applied by the coil, the axial force has to overcome the spring force so the adjusting element is lifted from its stop. The axial force required can be adjusted very accurately by adjustment of a corresponding current flowing via the coil, and the increasing spring force of the spring can also be taken into consideration during compression of the spring. Conversely, it is possible to ensure by means of an appropriate axial force that the adjusting element moves back to the stop if the spring force is greater than the axial force.

The magnetic field required for producing the axial force can be applied by a permanent magnet, but it is also possible to provide an electromagnet for this purpose.

If a permanent magnet is used, it is preferably integrated into the casing of the stud welding device. If an electromagnet is used, it can be placed in the connection between core and yoke.

If the adjusting element is to be moved in accordance with a predetermined pattern of movement, the stud welding device is preferably designed such that it is provided with a linear displacement measuring device from which there can be derived a displacement signal which corresponds to the respective relative position of casing and adjusting element and, as an actual value, is compared stepwise in a comparator with a desired value from a predetermined displacement-time graph for the movement of the stud holder read stepwise from a memory, the comparison signal of the comparator controlling the current intensity of a current source for supplying the coil.

A control process is carried out by comparing the actual signal with the stored desired signal using the displacement measuring device and the comparator, this control process ensuring that the displacement signal derived from the displacement measuring device is invariably opposed by the corresponding datum from the displacement-time graph so the sequence of movement corresponding to the displacement-time graph may be maintained with great accuracy during the movement of the adjusting element. In particular, this allows a rapid stud lifting movement and a correspondingly rapid return of the stud with an adequate interval for the melting of the material at the weld, it additionally being possible to design the return movement of the stud into the melt at the end such that the weld stud sinks into the melt at a desired speed, in particular preventing the molten material from being sprayed away during impingement of the weld stud, this frequently occurring when a spring is used alone to produce the return force of a weld stud.

The storage of the displacement-time graph in the memory also permits different displacement-time graphs to be provided as a function of the workpieces to be welded in each case, and these displacement-time graphs can be called up selectively during operation of the stud welding device.

The adjusting element including the stud holder is preferably pressed by the spring into its forward position relative to the stud welding device. From this position, the adjusting element is displaced, during application of a stud held by the stud holder onto a workpiece, into a reference position which is supplied from the displacement measuring device as a reference signal to the comparator from which the predetermined displacement-time graph is derived. Owing to this reference position, which automatically arises during application of the stud onto a workpiece, the respectively predetermined displacement-time graph can be derived without orientation of the stud relative to the stud welding device, the respectively adopted reference position automatically forming the starting position for the movement of the stud. With the application of the stud, the stud welding device is automatically orientated with respect to its height relative to the workpiece without a special manipulation being required for this purpose.

Another problem in conventional stud welders such as those which use solenoids to control the back and forth movement of the welding gun from a retracted position to an operative position in which the stud is juxtaposed to a metal part to which it is to be welded in the need to adjust for each different type of weld. Because the stroke of conventional drives is often short, because the position of the workpiece to which welding must be accomplished varies over a range larger than the stroke, and because the amount which the stud "sticks out" from the welding head varies, it can be difficult to accommodate these variations in a smooth, high speed operation. The reliability of welders could be improved and their expense reduced by using an actuator with a long stroke. Typically, a suitably long stroke would be about 10 mm.

One object of this invention is, accordingly, the provision of an improved magnetically driven stud welding device which is capable of smooth, high speed operation over a long stroke path. The object is achieved by the structure of this invention.

The invention is described in detail hereinafter with reference to a specific embodiment illustrated in the accompanying drawings in which:

DESCRIPTION OF THE PREFERRED EMBODIMENT

Figure 1:
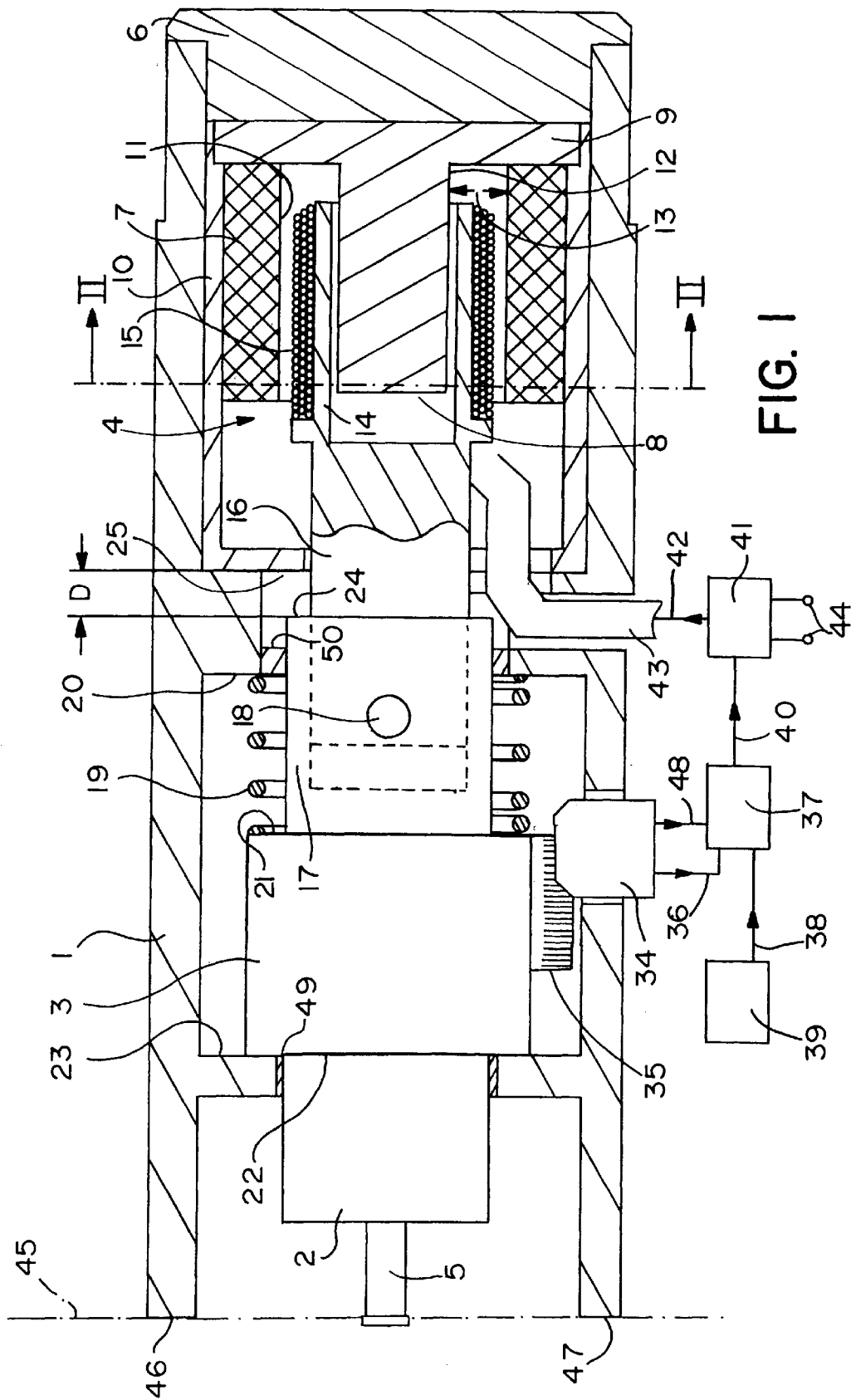
FIG. 1 shows the stud welding gun equipped with a permanent magnet with the stud holder in its forward position.

FIG. 1 shows a stud welding device with a casing 1, a stud holder 2, an axially movable adjusting element 3 and a magnet system 4. A weld stud 5 which is to be welded to a workpiece (not shown) is fixed in the stud holder 2. The casing 1 encloses the stud holder 2, the adjusting element 3 and the magnet system 4 and is closed at its end remote from the stud holder 2 by the rear wall 6.

The magnet system 4 responsible for the movement of the stud holder 2 consists of the permanent magnet 7, the core 8 and the yoke 9 which adjoins the core 8 and closes the magnetic flux originating from the permanent magnet 7. The material of the permanent magnet is samarium cobalt or neodymium boron iron which provides a relatively large magnetic field in response to a given magnetizing force in comparison to conventional materials. At its exterior, the permanent magnet 7 is surrounded by the casing 10 which consists of magnetically conductive material and supplies the flux conveyed via the yoke 9 to the rear of the permanent magnet 7. Between the internal face 11 of the permanent magnet 7 and the external face 12 of the core 8 there exists the air gap 13 in which the sleeve 14 with the coil 15 wound thereon is axially movably arranged. The magnetic field bridging the air gap 13 therefore passes through the coil 15 so the coil 15 is exposed to an axial force as current flows through the coil 15. This axial force is dependent on the one hand on the intensity of the magnetic field and on the other hand on the intensity of the current flowing through the coil 15, resulting in a corresponding axial displacement of the coil 15 and therefore of the sleeve 14 during the flow of current while allowing for the inertia of the components connected to the coil 15. The sleeve consists of magnetically non-conductive material, for example of a rigid plastics material, so it cannot influence the magnetic field passing through the coil 15.

The extension 16 adjoins the sleeve 14 in the direction of the weld stud 5 and continues into the length of tube 17 forming part of the adjusting element 3. The extension 16 is connected to the length of tube 17 by means of the pin 18 penetrating these two components. A non-positive connection of sleeve 14 is produced in this way via the extension 16 to the length of tube 17 and therefore the adjusting element 3 on which the stud holder 2 is fastened. Owing to a rigid connection between the coil 15 and the sleeve 14, axial forces originating from the coil 15 owing to the magnetic field act directly on the sleeve 14 so an axial movement of the coil 15 is transmitted in its entirety to the weld stud 5.

The movable adjusting element 3 is supported by bushings as shown at 49, 50. Bushings 49, 50 are preferably made of Frelon, a composite bearing material including a polytetrafluoroethylene compound which is available from the Pacific Bearing Seal Co. of Rockford, Ill., which has been found to withstand the large number of abrasive particulates and ions that are present in a welding environment and cause most known materials to fail in a very short time. Frelon provides an unexpectedly low friction with element 3 and to have any unexpectedly long life even in the extremely adverse environment of a welding gun.

The length of tube 17 carries the helical spring 19 resting on the one hand on an internal projection 20 of the casing 1 and on the other hand on a shoulder 21 of the adjusting element 3. The helical spring 19 presses the adjusting element 3 with its front face 22 against the internal shoulder 23 of the casing 1, the internal shoulder 23 forming a stop on attainment of which the adjusting element 3 adopts its front end position.

Against the tension of the helical spring 19, the adjusting element 3 and therefore all other components connected to it can be displaced axially into a rear end position which is defined by the end face 24 running against the front wall 25 of the casing 10. In order to bring the length of tube 17 and therefore the weld stud 5 and the coil 15 into this rear end position, a correspondingly high current has to be applied to the coil 15 to produce an axial force which overcomes the opposing force of the helical spring 19. The range of adjustment of the adjusting element 3/17 corresponds to the distance D.

Figure 2:
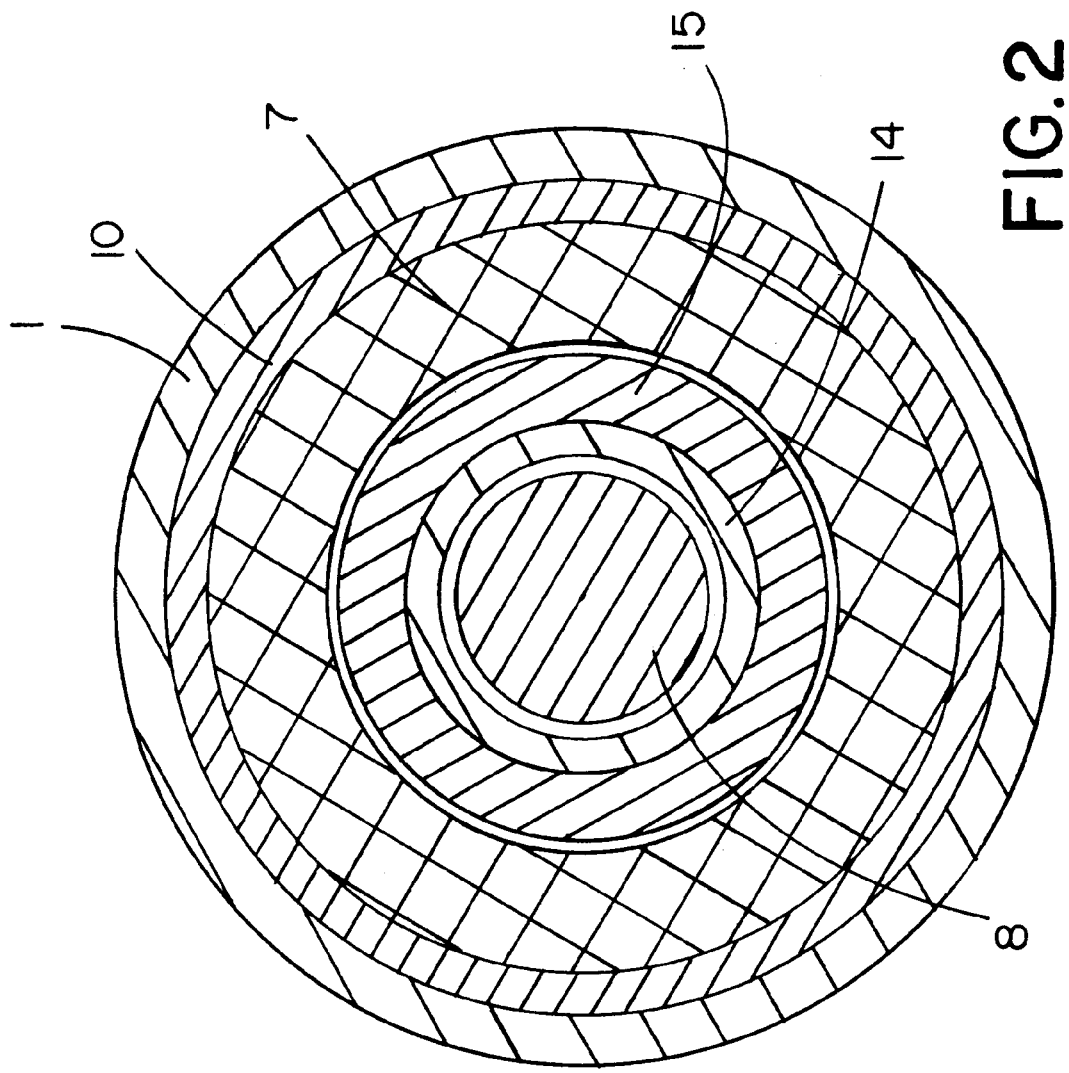
FIG. 2 is a section through the arrangement according to FIG. 1 along line II—II.

The above-described components of the stud welding device are essentially rotationally symmetric bodies, as shown in FIG. 2 which is a section along line II—II in FIG. 1.

Figure 3:
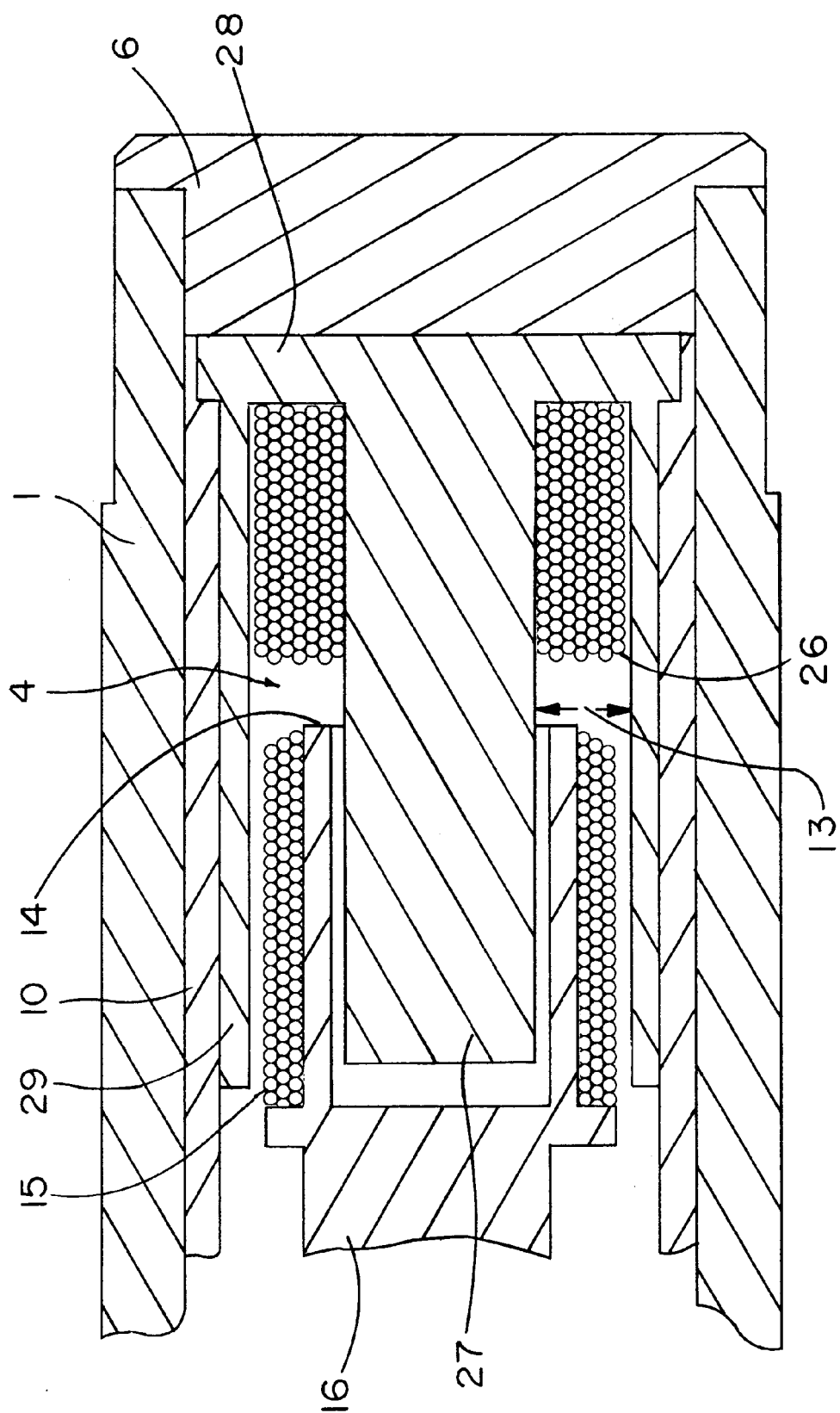
FIG. 3 shows the magnetic part of the stud welding gun according to FIG. 1 but with an electromagnet, the adjusting element being shown in a rear position.

FIG. 3 essentially shows the magnetic part of the stud welding device according to FIG. 1, but an electromagnet 26 which consists of a winding and applies the magnetic field required for the necessary axial movement is provided in the magnet system 4. The winding of the electromagnet 26 is wound onto the core 27 so the magnetic field originating from the electromagnet 26 spreads via the core 27 to the yoke 28 from where it is conveyed via the casing 10 and the bush 29 inserted therein to the coil 15. As in the embodiment according to FIG. 1, the coil 15 is wound onto the sleeve 14 which continues to the left into the extension 16. Casing 10 and bush 29 consists of magnetizable material. As in the embodiment according to FIG. 1, the entire arrangement is enclosed by the casing 1. The components which are connected on the left are the same as in the embodiment according to FIG. 1, so reference can be made to the description of FIG. 1 in this respect.

FIG. 3 shows the sleeve 14 in its rear end position. In this end position, the coil 15 is kept under the influence of the magnetic field of the electromagnet 26 of which the magnetic field bridges the air gap 13 between the external surface of the core 27 and the internal surface of the bush 29. A magnetic flux which passes radially through this air gap and to which the coil 15 arranged axially movably in the air gap 13 is fully exposed is therefore produced as in the embodiment according to FIG. 1.

Movements at accurately maintained speeds along the path covered can be achieved within a period of up to 1 second required for the entire welding process using the stud welding devices shown in FIGS. 1 and 3. During these movements it is important to utilize a pilot current which is switched on when the weld stud makes contact with the workpiece to ignite a pilot arc which burns after the pilot current has been switched on owing to removal of the weld stud from the workpiece, then to produce a melt on the workpiece by means of the welding arc which is also switched on while holding the weld stud in a rear end position, whereupon the weld stud is moved beyond the previously adopted starting position in the direction of the workpiece, the weld stud sinking with its end face into the melt which then solidifies. Owing to the melt, the weld stud adopts a position which is advanced slightly further than the starting position and into which it is moved at a relatively low speed so that the spraying of liquid metal owing to an abrupt entrance of the weld stud into the melt is prevented. Depending on the welding parameters (strength of the workpiece, thickness of the weld stud, workpiece material and the like) there are various patterns of motion for this sequence of movements which have to be observed in order to achieve optimum welds.

Figure 4:
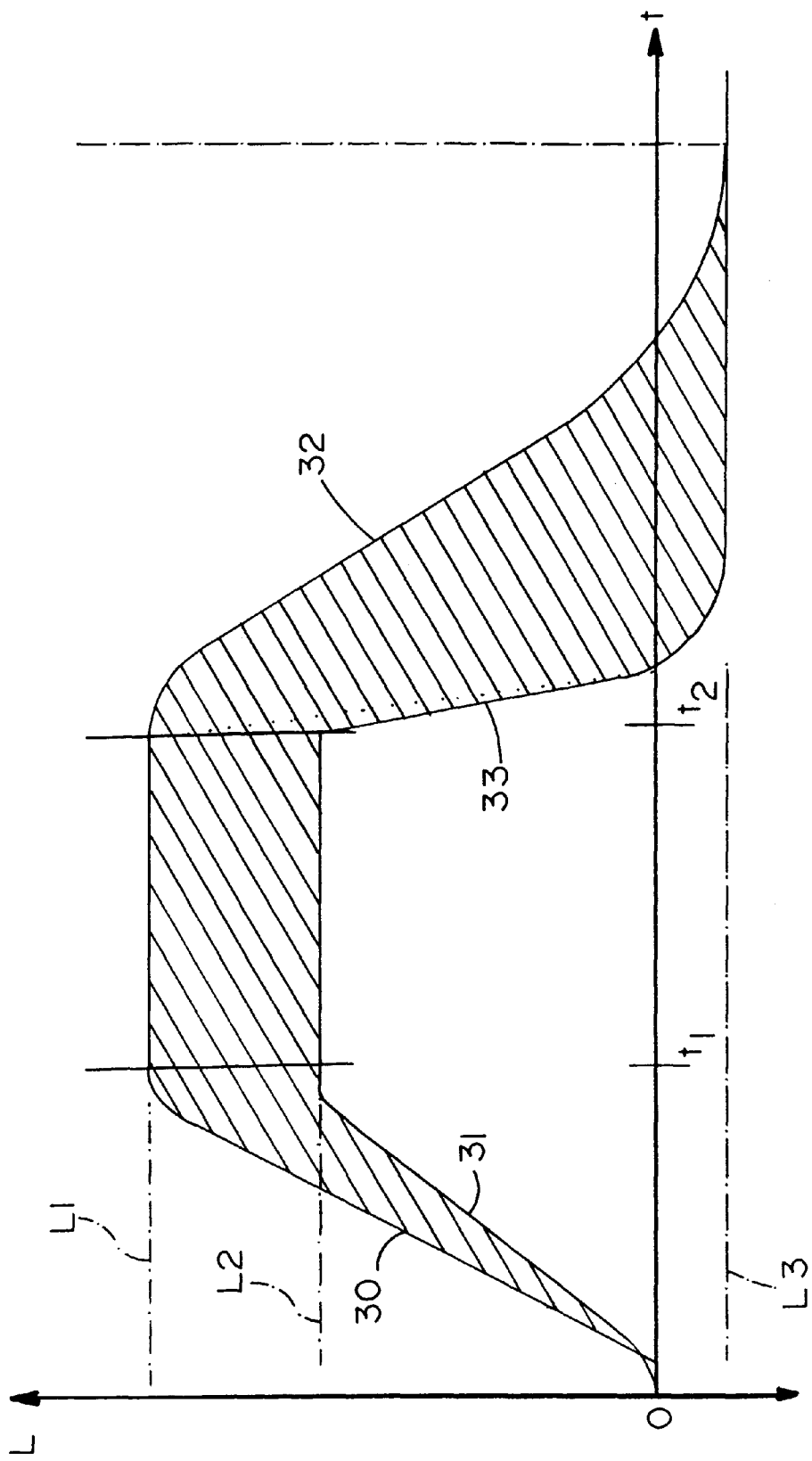
FIG. 4 is a displacement-time graph which is plotted as a range of movement and in which the movement of a weld stud has to take place while allowing for a given workpiece.

A range of movement comprising such a pattern of motion is plotted as a graph in FIG. 4. The respective position L of the weld stud with respect to a starting position 0 is plotted on the abscissa of the graph. The ordinate represents a time axis for the lapsed time t. In the graph, the individual points therefore represent the position L of the weld stud at a specific moment $t_x$. The hatched field represents the limit values for patterns of motion extending within this field. It starts from the starting position O and passes via the lines 30 and 31, reaching the end positions L1 and L2 in which the weld stud remains in its position between moments $t_1$ and $t_2$. The oblique position of the lines 30 and 31 represents the speed of the weld stud in its movement. After moment $t_2$, the weld stud is moved along lines 32 and 33 back in the direction of the workpiece where, after passing beyond the line 0 defining the starting position, sinks into the melt at a decreasing speed. The weld stud passes through the region from the line 0 to the line $L_3$, on attainment of which the weld stud has reached its end position after passing through the return movement. As shown, the lines 32 and 33 extend in the region between level 0 and $L_3$ with a constantly decreasing inclination, representing the decreasing speed.

Optimum welding of the respective weld stud is produced if the pattern of motion which is observed exactly during this movement lies in the hatched region according to FIG. 4.

The automatic resetting arrangement shown in FIG. 1 is provided in order to control the stud welding device in the sense of a pattern of motion described in conjunction with FIG. 4. This resetting arrangement is based on the absolute measurement of the respective position of the adjusting element 3 and therefore of the weld stud 5 by means of the linear displacement measuring device 34 which scans a scale 35 arranged on the adjusting element 3 and produces a corresponding displacement signal depending on the determined position of the adjusting element 3. This displacement signal is supplied via the line 36 to the comparator 37 which also receives stepwise, via the line 38 from the memory 39, position signals which represent a desired signal for the weld stud 5 in the sense of a pattern of motion contained in the memory 39. This desired signal, as an actual signal, is compared with the displacement signals transmitted via the line 36 and the result of comparison is conveyed via the line 40 to the controller 41 which adjusts the current strength of the current supplied to the coil 15 via the line 42. The line 42 is continued in the channel 43 shown as a pipe and is attached to the ends of the coil 15. The controller 41 receives, at its terminals 44, a voltage which is then adjusted on the basis of the comparison signal supplied via the line 40.

In detail, the following operations take place: one or more displacement-time graphs are stored in the memory 39 as laws of motion which can be called up selectively so the individual positions of the weld stud 5 at associated moments can be fed to the comparator 37 stepwise via the line 38. The comparator 37 compares these individual desired signals which are offered stepwise with the actual signals which are supplied via the line 36 and indicate the actual position of the weld stud 5. In the event of a deviation in the signals supplied to the comparator 37, the comparator 37 delivers a control voltage which is transmitted via the line 40 and of which the value and sign are controlled in a known manner by the controller 41 in such a way that the coil is supplied with either a stronger or a weaker current to be able to come as close as possible to the desired position of the weld stud 5. This process takes place stepwise according to the shape of the pattern of motion from the memory 39, the coil 15, and therefore the mechanism connected to it in its entirety, being forcibly moved. In particular, it is possible to adjust the respective speed of the coil 15 in the manner required for the respective phase in the course of the welding process. In particular, the return movement from the rear end position in the direction of the workpiece can therefore be delayed during the immersion of the weld stud 5 into the melt, for which purpose the coil 15 may have to receive a current running in the reverse direction from before in order to decelerate the movement of the coil 15.

With this arrangement it is advantageously possible automatically to give the weld stud 5 a reference position during application of the stud welding device to a flat workpiece. This is effected by pressing the stud welding device according to FIG. 1 against a flat workpiece, the weld stud 5 projecting beyond the dot-dash connecting line 45 being pressed back against the pressure of the helical spring 19. The dot dash line 45 represents a plane connecting the end faces 46 and 47 of the casing 1. When the end faces 46 and 47 are applied to a flat workpiece, a defined position is produced with respect to the weld stud 5, this defined position giving the weld stud its reference position, as stated. This reference position is read from the scale 35 by means of the displacement measuring device 34 and is transmitted to the comparator 37 as a reference signal via the line 48. The comparator 37 therefore begins to operate on the basis of the reference signal as actual signal in comparison with the desired signal which is read from the memory 39 and must remain equal at the beginning of the welding process while the weld stud 5 remains in the adopted position. The pattern of motion is then covered in the above described manner, the actual signal supplied to the comparator 37 via the line 36 being included stepwise.

It is not necessary for the workpiece to have a plane configuration. Even if the workpiece has curves in the region of the welding process, it is still possible to displace the weld stud 5 into its respective reference position in which the weld stud contacts the workpiece. This is its reference position from which the welding process takes place in the conventional manner.

Utilizing a moving coil rather than a movable permanent magnet and selecting the magnet material to be a rare earth material such as samarium cobalt or neodymium boron iron, one can achieve speeds of up to 800 millimeters/second and coil strokes of over 5 mm. Coil strokes of up to 10 mm have been achieved. Such long strokes allow the position of the actuator to be adjusted to compensate for the variation in distance to the workpiece from the end of a stud. Faster response and more accurate position control of the coil are achieved by using a moving coil which has a much lower mass then the permanent magnet. Moreover, the tendency of moving permanent magnets to pull towards one side due to its attraction to nearby metal, known as off-axis side loading, results in excessive wear on the bearings and premature failure. Such an effect is avoided by using a moving coil.

Another advantage of the moving coil is the avoidance of the hysteresis present in moving permanent magnet actuators. Since the permanent magnet is surrounded by steel parts the amount of current required to move the permanent magnet at a given position will depend upon whether it is moving from the left or the right. No such effect can occur with a moving coil. Thus, the moving coil system allows for simpler and more accurate position control than does a moving permanent magnet and fixed coil system.

Accordingly, while this invention has been described with reference to illustrative embodiments, this description is not intended to be construed in as limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the true scope of the invention.

What is claimed is:

1. A stud welding device comprising an axially displaceable adjusting element for displacement from a front position into a rear position and back, in which a magnetic field generated by a fixed magnet and a moveable coil interact in such a way that, when the moveable coil is connected to a controllable current source, an axial force is produced in order to displace the adjusting element, the movement of which is transmitted to a stud holder, the moveable coil being rigidly arranged on a hollow body which is connected to the adjusting element and axially movably in an air gap between a magnetized core and a magnetizable sheath of the fixed magnet, the magnetic field being conveyed via at least one yoke connecting the magnetizable core and the magnetizable sheath while passing radially through the moveable coil, the moveable coil exerting on the adjusting element an axial force acting only in one direction as a function of the direction of current during current control.

2. Stud welding device according to claim 1, characterized in that a spring acts on the adjusting element, pressing the adjusting element into an end position defined by a stop.

3. Stud welding device according to claim 1, characterized in that the magnetic field is applied by a permanent magnet.

4. Stud welding device according to claim 3, characterized in that the permanent magnet is integrated into the sheath.

5. Stud welding device according to claim 1, characterized in that the magnetic field is applied by an electromagnet.

6. Stud welding device according to claim 5, characterized in that the electromagnet forms the connection between core and yoke.

7. Stud welding device according to claim 1, characterized in that it is provided with a linear displacement measuring device from which a displacement signal corresponding to the respective relative position of sheath and adjusting element can be derived, this displacement signal as actual signal being compared stepwise in a comparator with a desired signal from a predetermined displacement-time graph read stepwise from a memory for the movement of the stud holder, the comparison signal of the comparator controlling the current strength of a current source for supplying the coil.

8. Stud welding device according to claim 7, characterized in that a plurality of displacement-time graphs allocated to associated workpieces to be welded are stored in the memory.

9. Stud welding device according to claim 2, characterized in that the adjusting element is pressed by the spring into its front position from which it is displaced during application of a stud held by the stud holder onto a workpiece into a reference position which is supplied as a reference signal from a displacement measuring device to a comparator from which the predetermined displacement-time graph is derived.

10. A stud welder according to claim 9, wherein said permanent magnet is a rare earth material.

11. A stud welder according to claim 10, wherein said permanent magnet is selected from the group consisting of samarium cobalt and neodymium boron iron.

12. A stud welder according to claim 10, wherein said coil moves with a speed of up to 800 millimeters/second.

13. A stud welder according to claim 10, wherein the stroke of said coil is greater than 5 mm.

14. A stud welder according to claim 10, wherein said stroke is 10 mm.

15. A stud welder according to claim 10, further comprising a linear encoder for monitoring the position of the actuator shaft.

16. A stud welder according to claim 10, further comprising a host computer coupled to said controller and wherein said host computer and controller are programmed to control said actuator and welding head so that current into said welder is caused to flow after said welding head has positioned a stud adjacent a workpiece and said stud is quickly moved to contact the workpiece after an end of said stud has been mailed.

17. A stud welder according to claim 10, wherein said actuator has a bushing made of Frelon.

18. A stud welder according to claim 10, further comprising a disc spring having a central aperture engaging said actuator and outer bearing areas locked in place by a support.

19. A stud welder comprising:
a welding head having a stud receiving and retaining mechanism adaptable to hold an end of a stud towards a workpiece;
a linear actuator having a fixed permanent magnet defining a magnetic field and a moveable coil disposed within said magnetic field such that said moveable coil is axially positionable in said magnetic field when an electric current is applied thereto;
an actuator shaft operably coupling said moveable coil to said welding head; and
a controller coupled to said moveable coil and to said welding head, said controller operative to energize said moveable coil with said electric current to axially position said moveable coil and said welding head between a retracted position and an extended position, said controller further operative to cause a welding current to flow to said welding head.

* * * * *